Feb. 23, 1937.  J. HUBER  2,071,465

FREEZING APPARATUS

Filed May 2, 1933

INVENTOR
Joseph Huber
per Karl H. Mayr.
Attorney

Patented Feb. 23, 1937

2,071,465

UNITED STATES PATENT OFFICE 2,071,465

FREEZING APPARATUS

Joseph Huber, Freising, Germany

Application May 2, 1933, Serial No. 668,925
In Germany May 17, 1932

11 Claims. (Cl. 62—105)

This invention relates to a new method and apparatus of transforming matters from a liquid to a solid state which is particularly applicable to the production of ice.

An object of my invention is to provide a method and an apparatus for the continuous production of ice.

An object of my invention is to provide a new method and apparatus for the removal of ice from the freezing vessel.

An object of my invention is to provide a new method and apparatus for the production of clear ice without special means for stirring the liquid during the freezing process.

An object of my invention is to provide a new method and apparatus for continuously freezing liquids in a vessel within a cooling substance, whereby the heat transmission from the liquid to the cooling substance is considerably increased by maintaining the liquid in motion during the freezing process.

An object of my invention is the provision of a new and improved method and apparatus for the continuous production of ice in cone-shaped cells, whereby the cells and the block of ice to be produced may have any cross-sectional configuration, f. i. a circle, or a square, or a polygon of any number of corners, and whereby the cell may be in any position—horizontal, vertical or inclined.

An object of my invention is the provision of a new and improved method and apparatus for the continuous production of ice in cone-shaped cells, whereby the cells may be cooled by any cooling medium, such as an evaporating medium or cooling medium remaining in a liquid state, such as brine, and whereby one or more cells may be within the same cooling jacket.

An object of my invention resides in the provision of a new method and apparatus for the continuous production of ice in block form, whereby the time required for freezing is considerably shortened and the ice block is gradually built up from the inside of the block to the outside, thus always assuring best heat transmission or cooling condition between the cooled wall of the form and the liquid to be frozen within the form.

An object of my invention resides in the provision of a new method and apparatus for the continuous production of ice in block form which assures an easy removal of the frozen block from the form without necessitating a shaking of the form or a warming up of the form entailing loss of power and heat.

Further and other objects of the present invention will be hereinafter set forth in the accompanying specification and claims and shown in the drawing which, by way of illustration, shows what I now consider to be a preferred embodiment of my invention.

Figure 1:
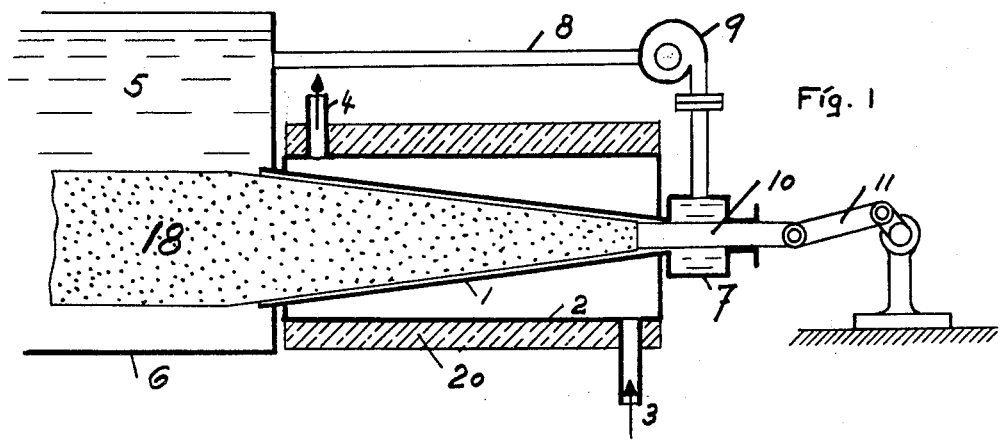
Fig. 1 is a cross-sectional view through an apparatus for carrying out my new continuous freezing process.

Referring more particularly to Fig. 1, 1 is the freezing cell which is of cone-shaped configuration; its cross section may be polygonal, round, square or rectangular. 2 is the cooling jacket, the cooling medium entering through inlet 3 and leaving the jacket through the outlet 4. The jacket 2 may also have any cross-sectional configuration and a plurality of inlets 3 and outlets 4 may be provided to assure a most suitable distribution and flow conditions of the cooling liquid within the jacket 2. The flow of the cooling medium may also be reversed, i. e. the medium entering at 4 and leaving the jacket at 3. Any number of freezing cells may be accommodated within one cooling jacket.

The cooling jacket may be supplied with a cooling liquid, brine, etc. or it may be supplied with a medium which evaporates while cooling the cell. In the latter case, another jacket 19 (Fig. 2) may surround the jacket 2, and the outer jacket 19 be supplied with brine and serve as a brine cooler at the same time. The outermost jacket will always be well insulated by insulation 20.

Figure 2:
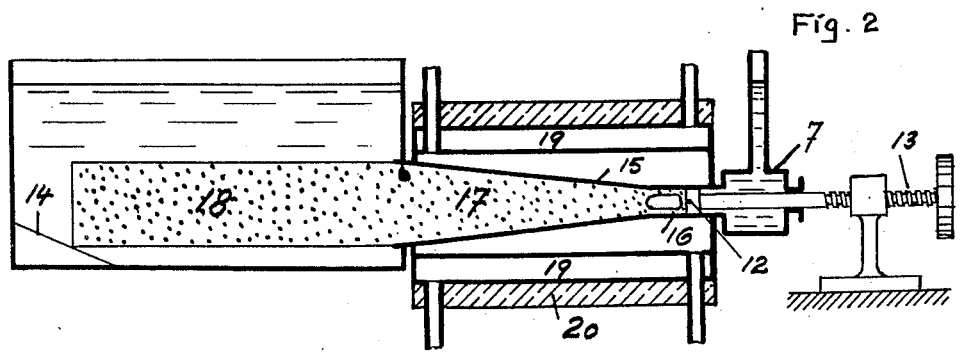
Fig. 2 is a cross-sectional view through a modified apparatus for carrying out my new continuous fast freezing process.

A reserve of the liquid 5 to be frozen is provided in tank 6 into which the ice block is discharged from the freezing cell 1. This liquid 5 is therefore precooled to a very low temperature. There may be also a special tank 7 adjacent to the narrow end of the freezing cell for the supply of the liquid to be frozen as shown on Fig. 2. The liquid to be frozen communicates into the freezing cell between the ice block and the walls of the cell either from the discharge end of the cell as shown in Fig. 1 or from the narrow end of the cell as shown in Fig. 2.

A communicating conduit 8 may be provided between the discharge end and the narrow end of the cell to permit the liquid to be frozen to enter the cell from both ends. Furthermore a circulating pump 9 may be provided which circulates the liquid 5 clockwise or counter-clockwise through the system. If the filling of the cell is left to a thermosyphon or gravity action the ice will contain air etc. and is not clear. If artificial circulation is used as for example by the provision of the pump 9 clear ice is obtained. In the latter case the provision of a larger tank 7 at the small end of the cell is not necessary. The ice is pushed out of the cell for example by a plunger or ram 10 which is operated by an excentric or crank shaft 11. Instead of the plunger 10 reciprocatingly operated by a crank a piston or ram 12 may be provided which is moved in axial direction by a worm 13 whereby either the worm or the worm nut may be driven by a motor or the like. The ice may also be pushed out of the freezing cell hydraulically whereby the liquid to be frozen may serve as operating medium itself. A piston, ram, plunger or the like may be interposed between the operating fluid and the ice. The means for pushing the ice out of the cell may be individual for each cell or common for a number of cells for example a common crank shaft may operate the rams of a plurality of cells.

The ice discharged by the cell at its wide end may be broken off periodically and automatically as soon as the block has reached the desired length. This breaking may be done by a special breaker, saw or the like or the block may be pushed against an inclined plate 14 (Fig. 2) and broken by the force within the block and transmitted from the ram 10 or piston 12 and the bending effect resulting from the inclined plate.

It is not necessary that the whole cell is conical. The cell may also consist of a conical part (15) and a straight part (16) as shown on Fig. 2. This reduces the space requirements and the manufacturing cost of the cell as the case may be. In the conical part the ice block is gradually built up from the center of the cell towards the outside and in the straight part the liquid freezes on the inside walls of this part. At each movement of the ram or piston 12 the ice will be broken off the side walls and pushed as pack ice against the ice core 17.

The operation of the improved continuously freezing apparatus is as follows:

The cold brine or a medium which evaporates during the cooling process is supplied to the cooling jacket 2 entering for example through an inlet 3 and leaving at 4. The tanks 6 and 7 are filled with the liquid to be frozen 5. This circulates freely by gravity or thermosyphon action through the freezing cell 1. A solid core of ice will be formed within this cell starting at the narrow end of the cell. This core is then pushed by the ram or piston 10, 12 towards the wide end of the cell and a free space will be developed between the block of ice and the interior wall of the cell. This space is readily filled with the liquid to be frozen which will flow in from the tank 6 and—if such a tank is provided—from tank 7. The liquid is then in motion and flows along the cold cell-wall and is thus exposed to best heat transfer conditions. It will freeze immediately and form a new layer of ice around the ice block in the center of the cell. This block is again pushed forwards and new room is provided for the inflow of liquid between the cell and the ice block, i. e. at the coolest zone of the cell. It is immediately frozen and the production of ice goes on—continuously. The time required for producing ice by this method is considerably shorter than by methods whereby the ice block remains within the cell during the whole freezing process and the liquid freezes from the outside towards the center of the cell and whereby the heat transmission is always hindered by the great insulating effect of the ice covering the wall of the cell; in fact, by such methods the core of the cell is never frozen solid unless one leaves the liquid in the cell for a very long time. Tests have shown that the freezing of a cell containing about 50 lbs. of water takes place 25 times as fast if the ice block is built up from the center of the cell toward the outside as if it is formed in the conventional manner. The finished block of ice 18 is gradually pushed into the tank 6. This block has parallel sides and may be broken or sawed off into pieces of equal length which float on the surface of the liquid in tank 6 which may serve at the same time as storage for the finished ice. The operation of means for an improved circulation such as by-pass conduit 8 with or without a circulating pump 9 is obvious from Fig. 1 and the aforesaid description of this figure.

Although the production of ice is one of the most important applications of my process and apparatus I do not limit this invention to this particular application. The method and apparatus can be used for continuously solidifying any other matter by cooling the matter.

What I claim is:

1. An apparatus for freezing liquid comprising a substantially cone-shaped freezing cell having a wide and a narrow end both ends being open, cooling means adjacent to and around said cell, a tank for storing the liquid to be frozen attached to one end of said cell and adapted to permit the liquid to permanently communicate freely between said tank and said cell, and means adjacent to said narrow end of said cell adapted to push the frozen liquid towards said wide end of said cone-shaped freezing cell, whereby a continuous block of frozen liquid emerges from said cell as fast as the liquid is frozen within said cell.

2. An apparatus for freezing liquids comprising a substantially cone-shaped freezing cell having a wide and a narrow end both ends being open, cooling means adjacent to and around said cell, liquid supply means permanently connected with one end of said cell and adapted to continuously supply liquid to be frozen to and to assure complete filling of said cell during all stages of operation of said apparatus, and means adjacent to said narrow end of said cell adapted to push the frozen liquid towards said wide end of said cone-shaped freezing cell, whereby a continuous block of frozen liquid emerges from said cell as fast as the liquid is frozen within said cell.

3. An apparatus for freezing liquids comprising a freezing cell of substantially cone shaped configuration having a wide and a narrow end, a tank for storing the liquid to be frozen attached to said wide end and means associated with the narrow end of said cell adapted to push the frozen liquid out of said cell and a conduit connecting said tank and said narrow end of said cell and pumping means interposed in said conduit for circulating the liquid through said conduit, said cell and said tank.

4. An ice producer comprising a cone shaped cell having a narrow and a wide end and having both ends open and continuously immersed in water, said cell being surrounded by a jacket adapted to receive a cooling substance, a ram provided at the narrow end of said cell adapted to push the ice produced from said narrow end toward and out of said wide end of said cell, whereby a continuous block of ice emerges from said cell as fast as the ice is formed within said cell.

5. An apparatus for freezing liquid comprising a substantially cone-shaped freezing cell, having a wide and a narrow end, both ends being open, cooling means adjacent to and around said cell, a tank for storing the liquid to be frozen attached to the ends of said cell and adapted to permit the liquid to communicate freely between said tank and said cell through both of said open ends and means adjacent to said narrow end of said cell adapted to push the frozen liquid towards said wide end of said cone-shaped freezing cell, whereby a continuous block of frozen liquid emerges from said cell as fast as the liquid is frozen within said cell.

6. An apparatus for freezing liquids comprising a freezing cell of substantially cone-shaped configuration and having a wide and a narrow open end, cooling means adjacent to and surrounding said cell, a tank for storing the liquid to be frozen attached to said wide end and pushing means associated with the narrow end of said cell and adapted to push the frozen liquid out of said cell and into said tank and a conduit connecting said tank and said narrow end of said cell and permitting flow of the liquid outside of said cell between said tank and said narrow end.

7. An apparatus for freezing liquids comprising a substantially cone-shaped freezing cell having a wide and a narrow end, both ends being open, cooling means adjacent to and around said cell, liquid supply means connected with the ends of said cell and adapted to supply liquid to be frozen to and to assure complete filling of said cell, and means adjacent to said narrow end of said cell adapted to push the frozen liquid towards said wide end of said cone-shaped freezing cell, whereby a continuous block of frozen liquid emerges from said cell as fast as the liquid is frozen within said cell.

8. An apparatus for freezing liquids comprising a substantially cone-shaped freezing cell having a wide and a narrow end, both ends being open, cooling means adjacent to and around said cell, liquid supply means connected with the ends of said cell and adapted to supply liquid to be frozen to and to assure complete filling of said cell, pushing means adjacent to said narrow end of said cell adapted to push the frozen liquid towards said wide end of said cone-shaped cell, whereby a continuous block of frozen liquid emerges from said freezing cell as fast as the liquid is frozen within said cell, and inclined means located in the path of the frozen block adapted to divert the block which is under the pressure of said pushing means and to thereby break the block.

9. An apparatus for freezing liquids comprising a substantially cone-shaped freezing cell having a wide and a narrow end, both ends being open, cooling means adjacent to and around said cell, liquid supply means connected with the ends of said cell and adapted to supply liquid to be frozen to and to assure complete filling of said cell, pushing means adjacent to said narrow end of said cell adapted to push the frozen liquid towards said wide end of said cone-shaped freezing cell, whereby a continuous block of frozen liquid emerges from said cell as fast as the liquid is frozen within said cell, and an inclined plate located in the path of the frozen block at a distance from said wide end and adapted to divert the block which is under the pressure of said pushing means and to thereby break the block at a point between said wide end and said plate.

10. Apparatus for freezing liquids comprising a substantially cone-shaped freezing cell, having a wide and a narrow end, both ends being open, cooling means adjacent to and around said cell, a tank for storing the liquid to be frozen attached to the wide end of said cell and adapted to permit the liquid to communicate freely between said tank and said cell, pushing means adjacent to said narrow end of said cell adapted to push the frozen liquid towards said wide end of said cone-shaped freezing cell, whereby a continuous block of frozen liquid emerges from said cell as fast as the liquid is frozen within said cell, and an inclined surface within said tank located in the path of the frozen block and adapted to divert the block which is under the pressure of said pushing means and to thereby break the block.

11. The process of continuously making frozen cakes consisting in continuously filling a freezing cell having diverging walls with a liquid to be frozen and in substantially continuously pushing the frozen liquid out of said cell, whereby a continuous cake of frozen liquid emerges from said cell, and in breaking the cake by pushing it against an inclined surface.

JOSEPH HUBER.